E. S. SHIMER.
BALL BEARING.
APPLICATION FILED SEPT. 15, 1914.

1,143,590.

Patented June 15, 1915.

Witnesses:
A. A. Hammond
Frank H. Borden

Inventor:
Elmer S. Shimer
by Louis Bagger & Co.
his Attys.

UNITED STATES PATENT OFFICE.

ELMER S. SHIMER, OF MILTON, PENNSYLVANIA, ASSIGNOR TO SAMUEL J. SHIMER & SONS, OF MILTON, PENNSYLVANIA.

BALL-BEARING.

1,143,590. Specification of Letters Patent. Patented June 15, 1915.

Application filed September 15, 1914. Serial No. 861,824.

*To all whom it may concern:*

Be it known that I, ELMER S. SHIMER, citizen of the United States, residing at Milton, in the county of Northumberland and State of Pennsylvania, have invented certain new and useful Improvements in Ball-Bearings, of which the following is a specification.

This invention relates to an improvement in ball bearings, and the object is to provide means for spacing the balls an equal distance apart, so that the balls are tight or self-supporting, thereby preventing the balls from creeping toward each other to such an extent that the internal bearing would lose its position in relation to the other bearing.

The invention relates to still other novel features of construction and combinations of parts which will be hereinafter more fully described and pointed out in the claims.

Figure 1:
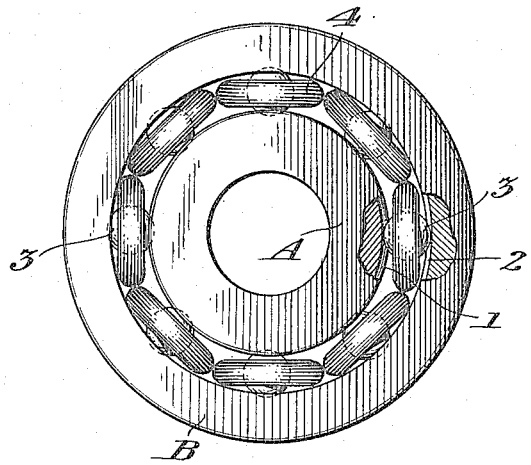
Figure 2:
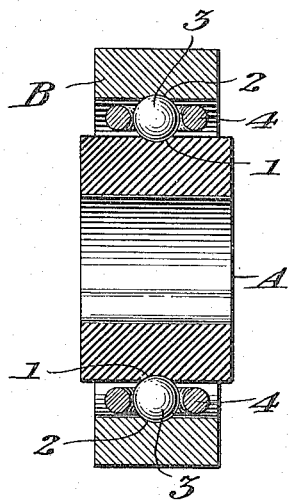
Figure 3:
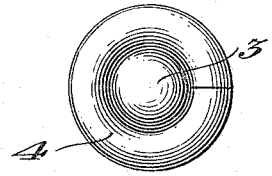

In the accompanying drawings: Figure 1 is a view in elevation of the invention; Fig. 2 is a longitudinal vertical sectional view; and Fig. 3 is a detail view showing one of the balls with the spacer applied thereto.

In the drawings I have shown a central or inner ball race member A and an external ball race member B, the member A being provided with an annular groove 1 on the periphery thereof, and the external member with an annular groove 2 formed on the inner surface. Received between the two members and in the grooves are balls 3, 3. In this particular instance, eight balls are shown. The depths of the grooves are so arranged that when the balls are inserted therein, and spaced equidistant around the circular opening between the two members, the balls are tight or self-supporting. Now if the balls were allowed to remain, or should be used, in this condition, they would creep toward each other to such an extent that the internal member would lose its position in relation to the other member, and in order to keep the balls an equal distance apart, rings or spacing means 4 are applied to each ball. The rings 4 are made from brass, copper, or any other soft metal. The rings are open on one side, and are inserted around the balls after they have been placed between the two ball race members, and the open portion of the ring is closed by bringing the two ends together. This is accomplished by a tool which will cause the two ends of the ring to be brought together, so as to form a ring encircling the ball. The balls are free to rotate within the rings, thereby relieving the friction and forming a support for the outer member upon the inner member. The rings serve to keep the balls in their relative position for proper work.

From the foregoing, it will be seen that a very simple arrangement has been provided for maintaining the balls an equal distance apart, while the rings which maintain the balls in a separated condition can be easily applied to the balls after the balls have been placed in position. A further advantage is in the small cost of manufacture of these rings, making the attachment a very inexpensive addition to the roller bearing.

I claim:

1. A ball bearing comprising two members having endless grooves, the walls of which are uninterrupted, balls having a portion thereof extending into each of said grooves, and separate means independently fashioned around each ball for maintaining the balls in proper relation.

2. A ball bearing comprising two grooved members, the walls of the grooves of said members being uninterrupted, balls inserted in the grooves, and separate means independently surrounding each ball which when applied thereto, preclude the dismemberment of the parts constituting the bearing.

3. A ball-bearing comprising inner and outer grooved ball-race members, balls received in the grooves, and spacing means fashioned around each ball for maintaining the balls in proper relation, said spacing means being tangential to the periphery of the innermost member.

4. A ball-bearing comprising two grooved ball-race members, balls received in the grooves, and spacing means fashioned around each ball for maintaining the balls in proper relation, said spacing means being of less thickness than the space between the members and of a length to afford contact at two points with one of the members and at one point with the other member.

In testimony whereof I affix my signature, in the presence of two witnesses.

ELMER S. SHIMER.

Witnesses:
H. W. CHAMBERLIN,
EDWIN PAUL.

Copies of this patent may be obtained for five cents each, by addressing the "Commissioner of Patents, Washington, D. C."